United States Patent [19]
Grube

[11] 3,740,818
[45] June 26, 1973

[54] ADAPTER FOR PIERCE NUT APPLYING TOOL

[75] Inventor: William L. Grube, Lake Bluff, Ill.

[73] Assignee: MacLean-Fogg Lock Nut Co., Mundelein, Ill.

[22] Filed: Oct. 26, 1971

[21] Appl. No.: 192,270

[52] U.S. Cl............................................. 29/211 D
[51] Int. Cl............................................. B23q 7/10
[58] Field of Search..................... 29/211 D, 432.1, 29/211 R, 211 I, 212 D, 432.2, 432

[56] References Cited
UNITED STATES PATENTS
3,405,436  10/1968  Koett............................... 29/432.1

Primary Examiner—Thomas H. Eager
Attorney—James A. Davis et al.

[57] ABSTRACT

An improvement upon a pierce-nut application tool which enables the tool to apply a pierce nut to a recessed, flanged or specially formed workpiece in which the point of application of the pierce nut is below the normal working plane of the tool. The improvement includes an extension on the tool which fits into the recess and feeds the nuts to the off-planar location. The nuts are accumulated in the extension and the accumulated nuts serve to transmit the nut-applying force from the punch in the tool to the nut to be applied.

10 Claims, 6 Drawing Figures

PATENTED JUN 26 1973  3,740,818

ADAPTER FOR PIERCE NUT APPLYING TOOL

This invention relates to tools for applying pierce nuts to workpieces.

In my co-pending application, Ser. No. 83,408, filed Oct. 23, 1970, for PIERCE NUT APPLYING METHOD AND TOOL there is disclosed a tool for applying pierce nuts to a workpiece. In that form, the tool is designed to work with pierce nuts in strip form, the nuts being severed from the strip and then punched through and clinched to the workpiece. The latter is shown as a flat sheet which may be embossed around the nut by the die cooperating with the punch to maintain a flat surface on one side of the sheet, i.e., the nut is not permitted to protrude above the flat surface.

Some workpieces, however, have nut-receiving surfaces which are located in recesses disposed below the general plane of the workpiece or adjacent to flanges, or in recesses which are barely wide enough to receive the pierce nut. Such locations of the workpieces are below the normal working surface of the tool and make it impossible for the tool to advance and secure the nut in its desired location on the workpiece, and it is accordingly an object of this invention to provide a pierce nut applying tool capable of applying a pierce nut to a workpiece in a location thereon which is removed from the normal plane of operation of the tool.

Another object of this invention is to provide an adapter for a pierce nut applying tool which will make it possible to use a presently available tool for workpieces which normally would not accept such tool, the adapter being extremely simple and inexpensive to make and attach to the tool.

As a more specific object, this invention seeks to provide an adapter for a pierce nut applying tool in the form of a tube having a length which is a multiple of the thickness of the pierce nut, having a nut-receiving opening which holds a plurality of nuts in a predetermined orientation, and having external longitudinal and peripheral contours accommodating the shape of the workpiece in the vicinity of the pierce nut.

A further specific object is to provide an adapter for a pierce-nut applying tool in the form of an extension on the tool in which extension a plurality of nuts are releasably held against movement out of the extension in either direction except when ejected by the punch during a nut-applying movement thereof.

These and other objects and features of this invention will become apparent from the following detailed description of a preferred embodiment of the invention when taken together with the accompanying drawings in which.

In its preferred form, this invention comprises a metal tube which is attached to the outlet opening of a known pierce nut applying tool so that the nuts are fed into the tube and stacked therein. The central opening in the tube is shaped to conform to the exterior contour of the nut so that the stacked nuts are held in a predetermined position in alignment with one another. Upper and lower resiliently held catches engage the top and bottom nuts in the stack so that as workpieces are moved under the stack, the nuts do not fall out of the tube. Once the tube is filled with nuts, the punch incorporated in the tool exerts its pressure upon the top nut in the stack, and the pressure is transmitted through the stack to the bottom nut which then is ejected from the tube to pierce the workpiece and be clinched thereto.

Figure 4:
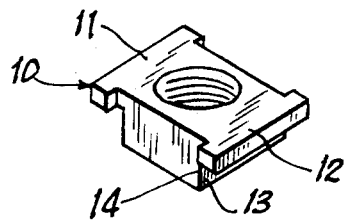
FIG. 4 is a perspective view of a pierce nut to be applied by the tool and adapter.

Referring now to the drawings for a detailed description of the invention and first to FIG. 4, a form of pierce nut is there disclosed at 10 to which the present invention may be readily applied. Said nut has laterally extending flanges 11 and 12 which remain on one side of the workpiece and serve as an abutment for limiting movement of the nut through the workpiece as well as for clinching the nut to the workpiece. The bottom portion 13 of the nut is punched through the workpiece and the corners 14 of the nut may be partly sheared off and deformed to clamp the nut to the workpiece.

Figure 2:
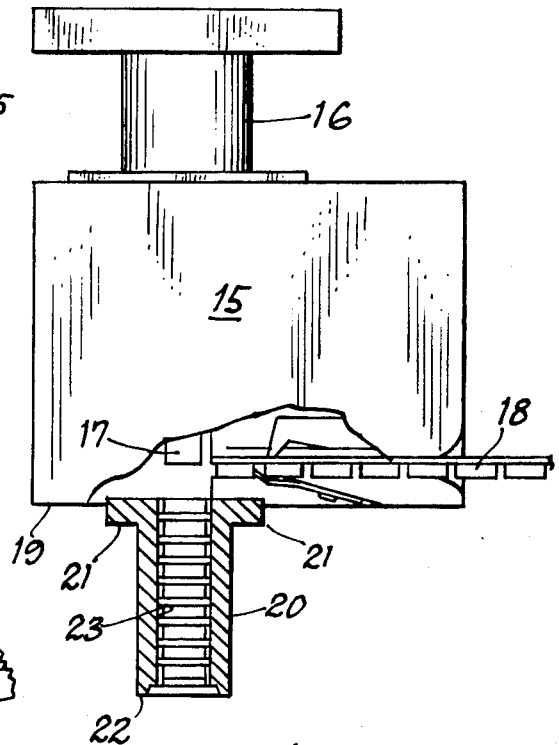
FIG. 2 is a side elevational view on a reduced scale of the nut-applying tool partly cut away, and the attached adapter, the latter being shown in section.

In FIG. 2 is shown in general outline the nut applying tool 15 which, as stated previously, is the subject of my previous application, Ser. No. 83408, filed Oct. 23, 1970, said tool being adapted to be secured to the frame of a press (not shown). Tool 15 has a punch 16, the upper end of which is designed to be secured to the ram of the aforementioned press. Punch 16 terminates at the bottom in a formed end 17 having the shape of the upper surface of nut 10 and is adapted to cut off and press downward the end nut of a strip 18 of nuts unwound from a suitable coil disposed adjacently the press. The nuts in strip form are disclosed and claimed in my prior application, Ser. No. 21,777 filed Mar. 23, 1970 for PIERCE NUTS IN STRIP FORM AND METHOD OF MAKING AND APPLYING SAME, issued on Dec. 5, 1972 as U.S. Pat. No. 3,704,507 and are disclosed herein merely for illustrative purposes as a convenient source of nuts. It is understood that other means of supplying nuts to the tool or to a nut applying device may be used without departing from the spirit of this invention.

As generally used, tool 15 has a lower surface 19 which is adapted to rest upon the workpiece to which a pierce nut is to be fastened. Such workpiece is flat over an area large enough to accomodate the entire tool 15 so that no problem is created in locating the tool precisely over the point on the workpiece to which the pierce nut is to be applied. It frequently occurs, however, that the workpiece is not flat, but is formed either with recesses in which the nuts are to be located, or with flanges immediately adjacent the location of the nut, so that the bottom surface 19 of tool 15 cannot be placed directly upon that portion of the workpiece to which the nut is to be applied. Unless the bottom die, normally cooperating with the punch, is located in a manner to enable the workpiece to be held against surface 19, the nut cannot be applied to the workpiece.

The problem presented by a recessed or flanged workpiece is solved by the present invention by providing tool 15 with a tubular extension 20 disposed immediately below the punch in the tool to receive the nuts as they are ejected from the tool by the formed end 17 of the punch. The tubular extension 20 thus serves to conduct the nut to a depressed or otherwise inaccessible location. It also serves, in a manner to be hereinafter described, to enable the punch to transmit the force of the punch to the bottom nut in the tube so that the nut can pierce the workpiece placed adjacent the open end of the tube and be secured thereto. Tubular extension 20 thus functions as an adapter to make tool 15 usable in recessed or flanged workpieces.

Tubular extension 20 may be a machined part or it may be a stamped part depending upon the number of identical extensions to be manufactured. In the form chosen to illustrate this invention, tubular extension 20 is a machined part and is provided with flanges 21 by which it is secured to the bottom surface 19 of tool 15. The bottom 22 of extension 20 is formed in a manner to cause the nut to be displaced out of the plane of the workpiece so that one surface of the nut is flush with a surface of the workpiece. However, where it is not desired to recess the nuts the bottom of extension 22 may be flat.

It is contemplated that at the initial operation of the tool, nuts 10 will be cut off from strip 18 and fed into a formed opening 23 in extension 20 until the bottom nut is in contact with the workpiece. Thus the length of the extension 20 will depend upon the depth of the recess, or the height of the flange in the workpiece into which, or adjacent to which, the nut is to be applied. In any event, however, the length of the extension will be an even multiple of the thickness or axial dimension of a nut so that the bottom nut will just contact the surface of the workpiece when the extension is filled. This will prevent a partial piercing of the workpiece by a nut and a consequent failure to clinch the nut to the workpiece. The cross-sectional contour of the opening 23 will be substantially identical with the peripheral contour of the nut 10 at the flanges 11 and 12.

It may be stated at this point, however, that experiments have shown that even though a nut may miss being pushed completely into the workpiece by as much as 0.040 inch, it will nevertheless be sufficiently firmly held in the workpiece so that when a bolt is threaded into the nut, the latter will be drawn into the workpiece and satisfactorily tightened as though it had originally been pushed all the way into, and clinched to the workpiece. This characteristic of this form of nut and tool also makes it possible to stack as many as nine nuts without fear that the accumulated tolerances would prevent the end nut from being applied to the workpiece. Assuming a nut thickness tolerance of ± 0.002 inch, nine nuts would produce a total gap between the nut and workpiece surface of 0.018 inch which is less than the maximum allowable gap of 0.040 inch.

Figure 1:
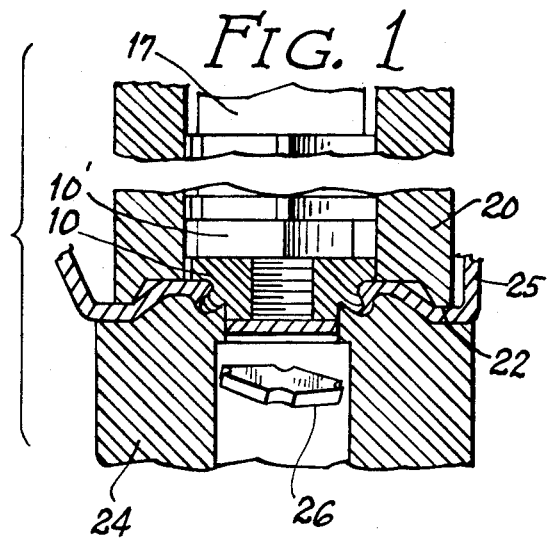
FIG. 1 is a vertical section through the lower portion of the adapter showing it in operation.

The relative position of the parts of the tool extension and workpiece are shown in FIG. 1. In that figure the bottom die 24 is shown under a workpiece 25 and the bottom 22 of tubular extension 20 is shown resting upon the upper portion of the upper surface of workpiece 25. A nut 10 is shown clinched to workpiece 25 after the nut has pierced the workpiece and has ejected a slug 26 from said workpiece. Above nut 10 are stacked a number of nuts 10 up to the uppermost nut which bears against the bottom of punch 17. The force of the punch in its downward movement is impressed upon the top nut in the tube and is transmitted thereby through the intervening nuts to the bottom nut 10 shown in section in FIG. 1 in its finished position in workpiece 25.

Figure 5:
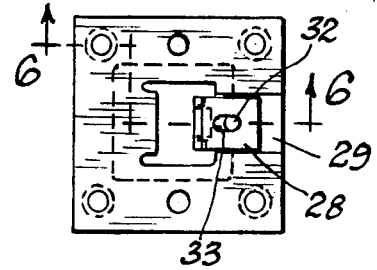
FIG. 5 is a plan view of the adapter and of the nut retainer located therein.

It is of course necessary to raise the tubular extension 20 out of the recess or away from the flange on the workpiece, or alternatively, to lower the workpiece with respect to extension 20 so that the nut applying tool can be used again, either at another location on the workpiece or upon another workpiece. At this point, however, extension 20 is filled with nuts, and unless some means is provided to retain them in the extension, they will fall out and disrupt the nut applying process. The top nut may also be drawn back out of the extension by the punch 17. To assist in holding the nuts in the tube between nut applying stages, the form of retainer shown in FIGS. 5 and 6 may be used. Said retainer is in the form of a relatively flat latch 27 which extends axially into opening 23 alongside the stacked nuts in the tube. Latch 27 has a flange 28 extending into, and reciprocable in, a groove 29 formed in the upper part of flange 21 of extension 20. The width of flange 28 is less than the width of groove 29 so that flange 28 will not bind in the groove even though latch 27 may be slightly turned in opening 23.

Between latch 27 and the wall 30 of the opening 23 is inserted a pad 31 of resilient deformable material which may be one of the synthetic elastomers compatible with oil and the environment of the extension 20. Said pad 31 is held in slightly compressed condition by latch 27 by a dowel pin 32 disposed in the upper end of extension 20 and extending into a slot 33 in flange 28. The length of slot 33 is such that when the right-hand end of the slot as viewed in FIG. 6 bears against pin 32, pad 31 will be slightly compressed as aforesaid.

It is contemplated that a nut 10 inserted into tube 20 by the tool 15 will be larger than the space provided between latch 27 and the opposite wall of opening 23 so that pad 31 will be compressed and will cause latch 27 to bear frictionally against the nut. As the tube 20 is filled with nuts, the bottom nut in the tube will be held against the short taper 34 on latch 27 and the top nut will be held against a shoulder 35. The reason for holding the top nut against reverse movement out of the opening 23 is that as the punch is withdrawn to start another cycle the top nut may adhere to the punch, either because of the oil coating on the bottom of the punch, or by a slight vacuum which is created as the punch is rapidly withdrawn from the tube.

Figure 6:
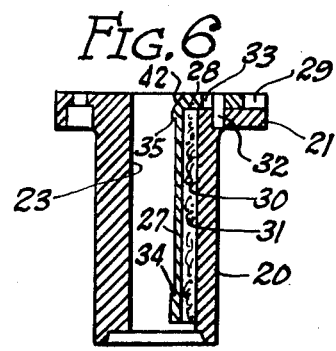
FIG. 6 is a side elevational view in section taken along line 6—6 of FIG. 5 of the adapter of FIG. 5.

Thus, as the nuts are successively pushed into extension 20 by punch 17, they encounter a lead-in taper 42 on latch 27 by which latch 27 is pushed to the right as viewed in FIG. 6 until shoulder 35 is cleared, whereupon the latch will snap back under the influence of resilient pad 31 to prevent the nut from following the punch back out of opening 23. When the latch snaps back, it bears against the nut to hold said nut frictionally in the opening 23. Flange 28 is slightly thinner than the depth of groove 29 so that a slight cocking of latch 27 in the opening is possible. Thus, when the first nut enters opening 23, the portion of pad 31 at the bottom of opening 23 will push latch 27 farther than the portion bearing against the nut, thus cocking the latch so that when the next nut enters the opening 23, the first nut will not be entirely free to fall to the bottom of the opening, but will be held by the cocked latch.

When the extension is full, the next nut will push the entire stack of nuts against the workpiece, the bottom nut being readily pushed past taper 34 and against the workpiece. As the workpiece is removed and replaced, the stack of nuts is held in extension 20 by the taper 34.

Figure 3:
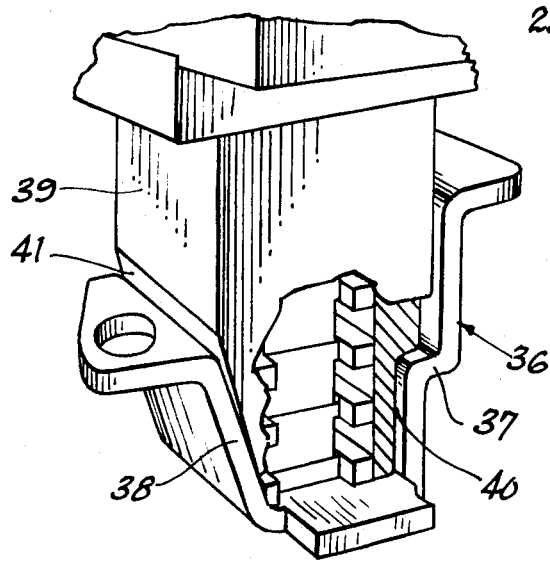
FIG. 3 is an enlarged perspective of a modification of the adapter and of a workpiece to which a pierce nut is to be applied.

Although the extension tube 20 would normally have a regular configuration; that is, the sides of the tube would be flat and straight, said tube may nevertheless be used for special situations where the workpiece has either a sloping side or a stepped side. One such example is shown in FIG. 3. It may be noted that the workpiece 36 has a step 37 in it as well as a sloping side 38. The sloping side may rise abruptly from the sides of the nut as might also the inner portion on the step 37. Under these circumstances the extension 39 is contoured to fit into the space between the step 37 and the sloping side 38. Thus extension 39 is provided with a corresponding step 40 and a sloping side 41. In this manner the extension may be adapted to fit into recesses or grooves in a workpiece which are smaller than the normal width of the extension.

Although the nut supply selected to illustrate this invention is a series of nuts connected together to form a strip, it is understood that the nuts may be supplied individually from a hopper provided with appropriate nut orienting and guiding means feeding the individual nuts to the nut applying tool, without departing from the spirit of this invention.

I claim:

1. In combination, a workpiece, a pierce nut adjacent said workpiece, a pierce nut applying tool, a punch in the tool for exerting pressure upon said pierce nut to pierce the workpiece, a die adjacent said workpiece opposite said punch for clinching said nut to said workpiece, and means intermediate said punch and pierce nut for transmitting the force of said punch to said nut, said means for transmitting the force of said punch comprising a tube intermediate the punch and said pierce nut, and at least one pierce nut in said tube intermediate the punch and said pierce nut.

2. In combination, a workpiece, a pierce nut adjacent said workpiece, a pierce nut applying tool, a punch in the tool for exerting pressure upon said pierce nut to pierce the workpiece, a die adjacent said workpiece opposite said punch for clinching said nut to said workpiece, and means intermediate said punch and pierce nut for transmitting the force of said punch to said nut, said means for transmitting the force of said punch comprising a tube intermediate the punch and said pierce nut, and a quantity of pierce nuts in said tube intermediate the punch and said pierce nut.

3. The combination described in claim 2, said tube maintaining the said quantity of pierce nuts therein in alignment with the said pierce nut.

4. The combination described in claim 2, and means for filling said tube and maintaining said tube in filled condition as nuts are removed therefrom and attached to said workpiece.

5. The combination described in claim 2, and resilient means for holding the quantity of pierce nuts in said tube.

6. The combination described in claim 2 and releasable latch means for holding the quantity of pierce nuts in said tube, said latch means comprising a bar disposed in the tube and bearing against the top and bottom nuts in the tube, and resilient means urging the bar against said nuts.

7. The combination described in claim 6, said bar having an inwardly extending shoulder at its upper end extending over the top nut to prevent said top nut from being withdrawn from the tube.

8. The combination described in claim 6, said bar having an inwardly extending taper at its lower end extending under the bottom nut to prevent said bottom nut from falling out of the tube.

9. The combination described in claim 6, said resilient means comprising a pad of resilient deformable material interposed between the bar and tube.

10. The combination described in claim 1, said tube comprising a separate element, and means for securing said element to the tool.

* * * * *